UNITED STATES PATENT OFFICE.

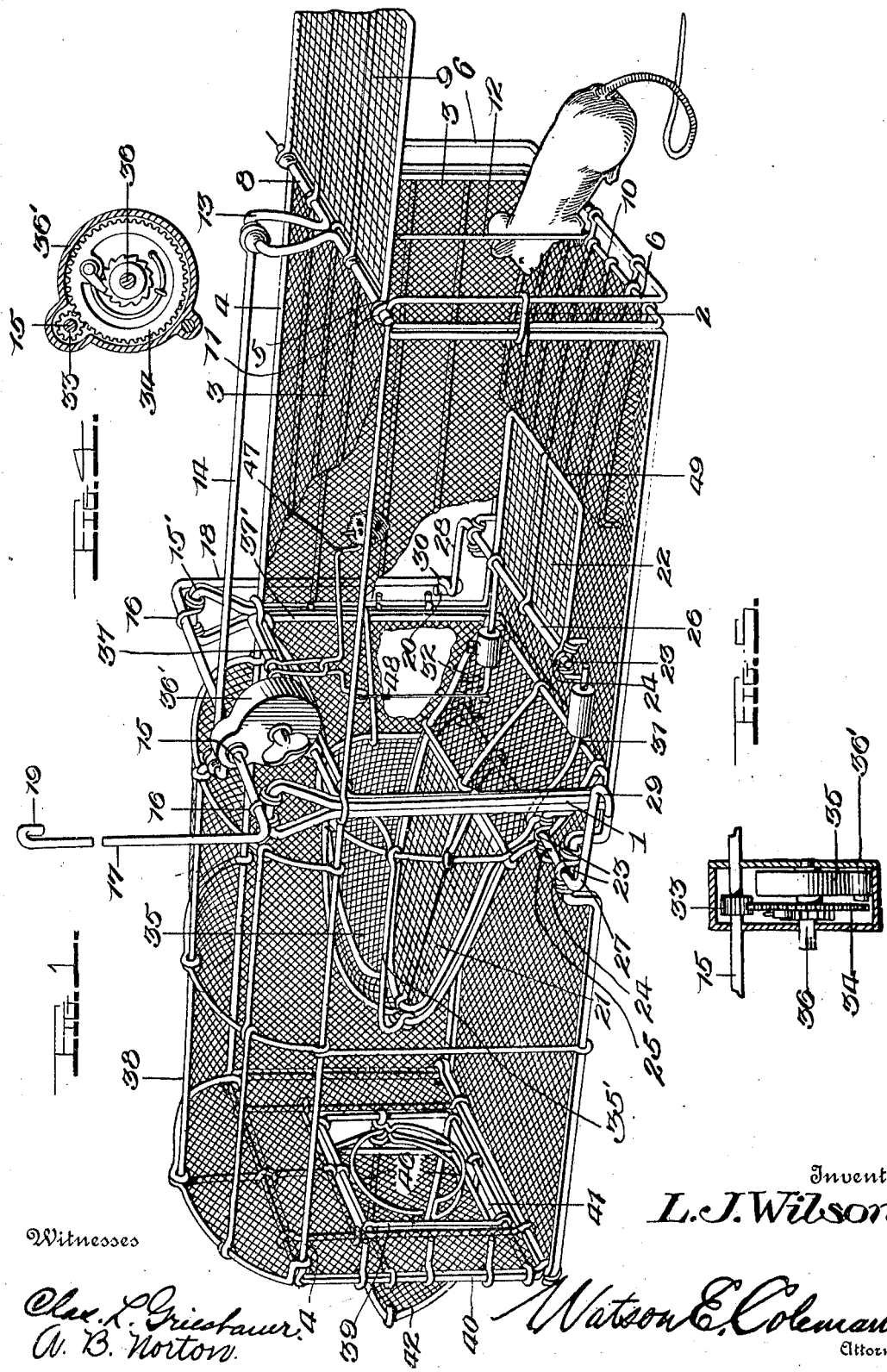

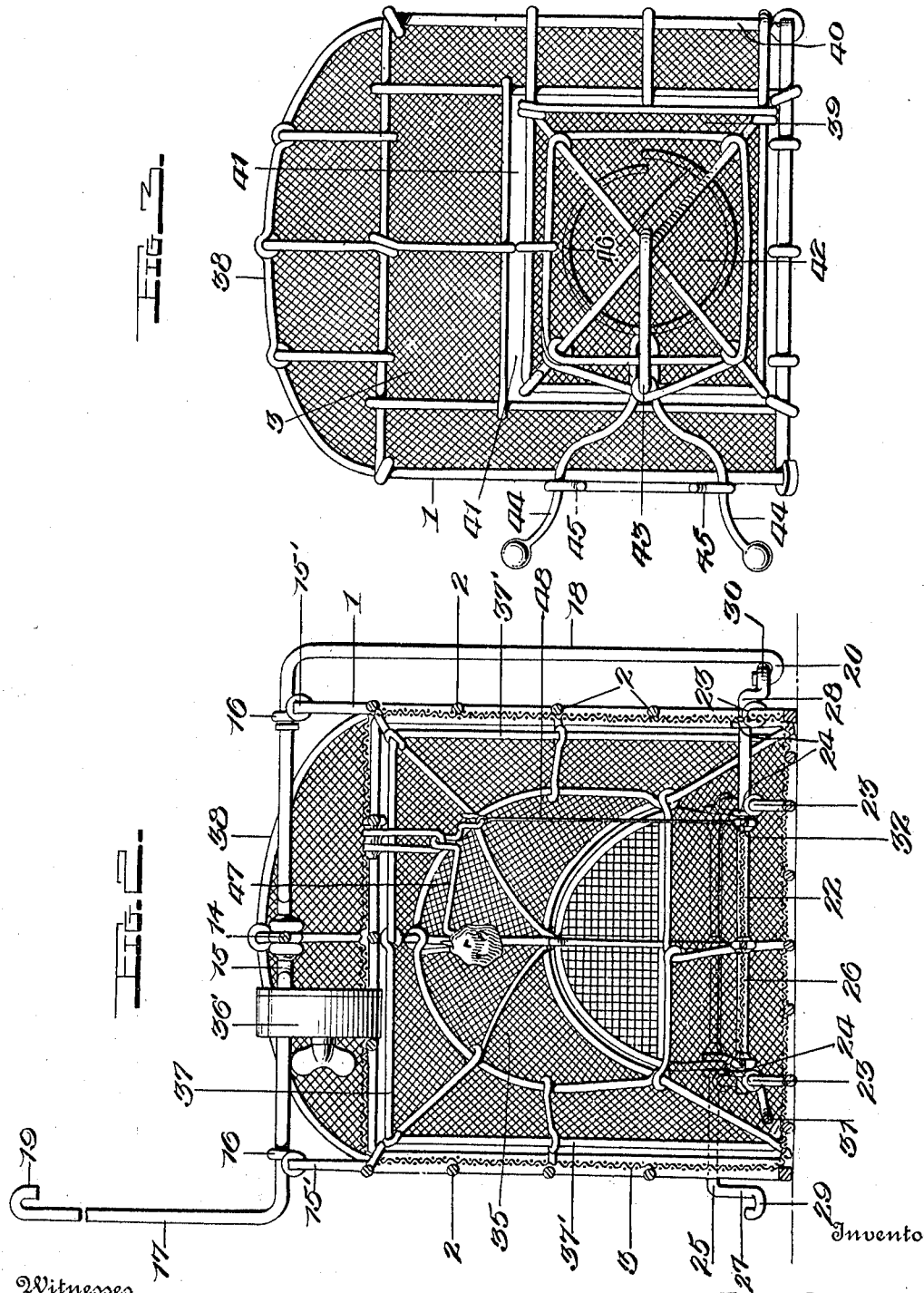

LORAN J. WILSON, OF JONESVILLE, VIRGINIA.

TRAP.

1,040,478.  Specification of Letters Patent.  Patented Oct. 8, 1912.

Application filed April 25, 1912. Serial No. 693,103.

*To all whom it may concern:*

Be it known that I, LORAN J. WILSON, a citizen of the United States, residing at Jonesville, in the county of Lee and State of Virginia, have invented certain new and useful Improvements in Traps, of which the following is a specification, reference being had to the accompanying drawings.

This invention comprehends certain new and useful improvements in animal traps and relates more particularly to victim-set traps in which a number of animals may be caught and caged.

The primary object of the invention is to provide a trap of this nature which shall be automatically set and which shall be simple, durable and inexpensive.

This invention also aims to generally improve traps of this type to render them useful and commercially desirable.

With these and other objects in view as will be more fully explained as the description proceeds, the invention consists in certain constructions and arrangements of parts as I shall hereinafter describe and claim.

For a complete understanding of the invention reference is to be had to the following description and accompanying drawing, in which:—

Figure 1 is a perspective view of the trap with the wire netting partly broken away; Fig. 2 is a transverse sectional view through the front portion of the trap and looking toward the rear. Fig. 3 is a rear elevation. Fig. 4 is a side elevation of the spring actuating mechanism, the casing and winding shaft being in section. Fig. 5 is an edge view of the spring mechanism, the casing being in section.

Similar parts are referred to in the description and designated in the drawings by like reference characters.

Referring to the drawing by numerals, 1 designates the main frame wire to which the lighter frame wires 2 are connected. A wire netting 3 extends over the frame wires, strengthening the frame and preventing the escape of entrapped animals. At the front of the trap the secondary frame wire 4 projects longitudinally past the main frame wire 1 as shown at 5 then is bent downwardly as at 6 and extended across the base of the trap.

The extensions 5 form bearings for the shaft 8 to which the front door 9 is rigidly secured. This shaft 8 is held in position on the bearings 5 by the wire rod 10 which extends across the base of the cage and is bent upwardly and secured to the main frame wire 1. The ends of this wire 10 are bent over the shaft 8 as shown at 11. The door 9 is prevented from swinging too far inwardly by the upright 12 which extends across the entrance of the trap.

The intermediate portion of the shaft 8 is bent to form the looped arm 13 which is connected by the rod 14 to the crank shaft 15. This crank shaft is mounted on the bearings 15' which are formed by extending the main frame wire upwardly above the top of the trap. The shaft is held on the bearings by the wire fasteners 16 which extend over the shaft and have their ends twisted around the bearings. The crank shaft 15 is provided at its ends, without the cage, with the oppositely extending arms 17 and 18.

The arms which lie in the same plane and extend at right angles to the crank shaft are provided at the outer extremities with the hooks 19 and 20 for engagement with similar hooks carried by the trip plates 21 and 22. These trip plates are pivotally connected at their inner edges to the bearings 23 formed by bending the base wires of the frame upwardly. Fasteners 24 similar to the fasteners 16 retain the trip plates on their bearings. The rods 25 and 26 forming the inner edges of the trip plates 21 and 22 respectively are extended beyond the base of the trap on opposite sides thereof and bent toward each other and parallel to the edge of the trap, to form the arms 27 and 28. These arms are provided at their outer ends with the hooks 29 and 30 which alternately engage the hooks 19 and 20 respectively on the arms 17 and 18.

Weighted arms 31 and 32 extend inwardly from opposite sides of the trip plates 21 and 22 respectively and hold the said plates normally in a raised position. To bring the hooks 19 and 20 into engagement with the hooks 29 and 30 I provide a small gear wheel 33 keyed to the crank shaft 15 and meshing with a larger gear wheel 34. A clock spring 35 is secured at one end to the shaft 36 of the gear wheel 34 and at the other end to a suitable casing 36'. This spring is wound in the usual way by a key engaging the end of the shaft 36. As the spring unwinds it will revolve the crank shaft carrying the arms 17 and 18 and cause the hooks carried thereon to alternately engage the hooks carried by the trip plates.

A semi-conical hood 35' is secured to the uprights 37' and cross bar 37 of the frame and extends over the trip plate 21 dividing the trap into two compartments. The top 38 of the rear compartment is arched to provide more space for the encaged animals.

To easily remove the animals from the rear compartment I provide a door 39 hingedly secured to the corner post 40 and adapted to swing across the aperture 41 in the rear wall of the trap. Extending outwardly from the door frame is a conically shaped hood 42. An angular brace wire 43 extends perpendicularly outward from the intermediate portion of the side 44 of the door 39 and connects to the apex of the hood 42. The inner portion of the brace 43 adjacent the door forms the pivotal connection for a pair of cross-levers 44. The handles of these levers project past the side of the trap and are adapted to engage the catches 45 to hold the door closed. The jaws 46 of the levers 44 extend across the opening of the hood 42 and are bent semi-circularly so as to grasp an animal securely while it is being removed from the trap. The usual method of getting the entrapped animals in reach of the jaws 46 consists in making a noise at the forward end of the trap to scare said animals. The animals will then endeavor to escape from the rear compartment and in doing so will pass between the jaws 46 into the hood 42 as this would seem to offer the only method of escape.

A bait hook 47 is suspended from the cross-rod 37 and projects over the trip plate 22, being held in a horizontal position by the rod 48 which is connected to the inner end of the bait hook and to the arm 32 of the trip plate.

It will be seen that the wires forming the base of the trap are bent upwardly as shown at 49. This brings the front portion of the base of the trap adjacent the trip plate 22 on a level with the same.

The operation of my trap is as follows: The hook 47 is baited and the trap set by opening the door 9 and catching hook 20 on arm 18, in hook 30 on the trip plate 22, which can only be done when the trip plate is raised. An animal endeavoring to reach the bait steps upon the trip 22 and bears it down, which releases the arm 18, whereupon the crank shaft 15 turns in a counter clockwise direction, allowing door 9 to close and bringing hook 19 on arm 17 into engagement with the hooked arm 27 of the tilting plate 21. It will be noticed that when the door 9 is closed the crank shaft 15 is on dead-center so that an outward push will not open the door even should it be strong enough to overcome the strength of the spring. The animal on finding the front of the trap closed will endeavor to escape through the rear of the cage, which it reaches by depressing trip plate 21 and passing under the hood 35'. The tilting of the trip plate 21 trips the hooks 19 and 29 allowing the crank shaft to turn until the hook 20 engages hook 30, at which time the door 9 will have been opened ready for the next catch. The animal in the rear compartment is prevented from returning to the front of the cage by the trip plate 21, which rose when released from the animal's weight, closing the opening under the hood. To remove the animal from the trap it is only necessary to grasp it between the jaws 46 of the cross-levers 44. The act of closing the jaws of the levers disengages the handles from the catches 45 allowing the door 39 to be opened.

It will be seen from the foregoing description, in connection with the accompanying drawing, that I have provided an efficient and durable automatic trap, capable of caging a number of animals.

Minor changes in the shape, size and construction of this trap may of course be made without departing from the scope and spirit of the invention as defined by the claims.

What I claim is:—

1. A trap comprising a cage having two communicating compartments, trip plates secured within said cage each provided with an arm, said arms being continuances of the inner edge of the trip plates and extending in relatively opposite directions, a rotary member extending transversely of the cage and provided at its ends with oppositely extending arms, one of which engages the arm carried by one of the trip plates, means for rotating said member when the same is released by the operation of the aforementioned trip plate, the other arm of said member engaging the arm carried by the other trip plate, the operation of the latter trip plate releasing the member for rotation to again engage the same with the arm of the first mentioned trip plate, a door hinged to the trap, means for connecting the door to the rotary member to cause said door to open and close with each complete rotation of the said member, the operation of the first mentioned trip plate serving to close the door and the operation of the second trip plate serving to open the door, said latter trip plate also serving to prevent communication between the two compartments of the trap.

2. A trap comprising a cage, trip plates secured within said cage each provided with an arm, said arms extending beyond the sides of the trap in relatively opposite directions and having their end portions bent parallel to each other, a crank shaft positioned transversely of the cage and having oppositely extending arms, said arms alternately engaging the corresponding arms carried by the trip plates, means for rotating said crank shaft when released from engagement with the trip plates by the operation of the same, a door hinged to the top of the trap and actuated by the rotation of the crank shaft, and a hood projecting over one of the trip plates to divide the trap into two compartments.

3. A trap comprising a cage, trip plates secured by their inner edges to the base of the trap, said inner edges being extended in opposite directions beyond the edge of the trap and each provided with an arm, a crank shaft positioned transversely of the cage, above and intermediate the trip plates, the crank shaft being provided with parallel oppositely extending arms each having a hook formed on its extremity, said hooks alternately engaging the corresponding arms carried by the trip plates, spring mechanism for actuating said crank shaft when the hooks carried on the arms thereof are released from engagement with the trip plates by the operation of the same, a door hinged to the top of the cage and opened and closed by the rotation of the crank shaft, and a semi-conical hood arranged over one of the trip plates and co-acting with the same to divide the trap into two compartments.

4. The combination with a trap having a front door and means for operating the same when released by an animal, of a swinging rear door, and means carried by said rear door for grasping an animal, said means serving to carry the animal from within the trap when the swinging rear door is opened.

5. The combination with a trap divided into two compartments, said trap having a front door and means for operating the same when released by an animal of a rear door hinged to the side of the trap and adapted to close the rear of the same, said door comprising a wire frame to which is secured an outwardly projecting conical hood, the mouth of the hood communicating with the interior of the trap, a pair of pivoted cross-levers secured at their pivotal point to the front edge of the door, said levers extending inwardly across the mouth of the hood and outwardly past the edge of the trap, and means for engaging the outwardly extended portions of said levers to hold the door closed.

6. The combination with a trap having a front door and means for operating the same when released by an animal, of a rear door provided with means for holding an animal and withdrawing the same from the trap, said means also serving to hold the door in its closed position.

7. The combination with a trap divided into two compartments, said trap having a front door and means for operating the same when released by an animal, of a rear door hinged to one side of the trap, said door being provided with an opening and having an outwardly projecting hood secured about the same, pivoted cross levers extending across said opening, and catches secured to the side of the trap opposite the side carrying the door, said cross levers being adapted to hold an animal endeavoring to pass through the opening in the door and also providing means for engagement with the aforementioned catches to hold the door in its closed position.

In testimony whereof I hereunto affix my signature in the presence of two witnesses.

LORAN J. WILSON.

Witnesses:
P. H. LARMER,
A. G. PRATT.

---

Copies of this patent may be obtained for five cents each, by addressing the "Commissioner of Patents, Washington, D. C."